United States Patent [19]

Oza et al.

[11] Patent Number: 4,482,819

[45] Date of Patent: Nov. 13, 1984

[54] DATA PROCESSOR SYSTEM CLOCK CHECKING SYSTEM

[75] Inventors: Bharat J. Oza, Endicott; Thomas J. Roche, Endwell, both of N.Y.

[73] Assignee: International Business Machines Corporation, Armonk, N.Y.

[21] Appl. No.: 342,270

[22] Filed: Jan. 25, 1982

[51] Int. Cl.$^3$ .......................... H03L 7/00; H03L 1/00
[52] U.S. Cl. ...................................... 307/269; 328/63
[58] Field of Search ................. 371/61; 375/107, 108; 328/63, 105; 307/480, 269

[56] References Cited

U.S. PATENT DOCUMENTS

| | | | |
|---|---|---|---|
| 3,745,472 | 7/1973 | Garth ..................................... | 328/63 |
| 3,974,333 | 7/1976 | May, Jr. et al. ..................... | 375/108 |
| 4,163,946 | 8/1979 | Alberts ............................ | 375/108 X |
| 4,185,245 | 1/1980 | Fellinger et al. ................ | 307/269 X |
| 4,295,220 | 10/1981 | Blum ..................................... | 371/61 |
| 4,419,739 | 12/1983 | Blum ................................... | 364/900 |

OTHER PUBLICATIONS

IBM Technical Disclosure Bulletin, vol. 9, No. 5, 10/66, p. 473, "Pulse Checking Circuit", to P. J. Veneziano.
IBM Technical Disclosure Bulletin, vol. 7, No. 1, Jun. 1964, pp. 32–33, "Clock Pulse Checking Circuit" to Bearnson, et al.
DIPs Verify Strobe Within Time Window to Robert A. Dougherty, Electronics, Feb. 5, 1976 at 102.

*Primary Examiner*—Jerry Smith
*Assistant Examiner*—Clark A. Jablon
*Attorney, Agent, or Firm*—Joseph F. Villella; J. Jancin, Jr.; Elmer W. Galbi

[57] ABSTRACT

A central clock signal generator generates a plurality of odd and even clock pulses which are distributed to a plurality of logic and circuit modules by clock signal lines of equal length. The central signal generator also generates a plurality of gate pulses which are supplied to the modules on signal lines which can be different in length from one to another. The gate pulses are wide enough to coincide with the clock pulses with appropriate allowance for skew between the pulses. For each pair of pulses engaged delivered to a module a detection circuit is provided which detects if the gate pulse and the clock pulse begin and end in the proper sequence. If an improper sequence occurs, the information is stored in a scannable latch and a machine stop control is generated. The exact failing module can be traced readily from the information supplied in this manner.

5 Claims, 4 Drawing Figures

DATA PROCESSOR SYSTEM CLOCK CHECKING SYSTEM

BACKGROUND OF THE INVENTION (1) Field of the Invention

This invention relates to checking systems, and particularly to an improved system for checking the reception and width of pulses used in synchronously timing the various subsystems in a data processor. These arrangements, usually known as "clock" systems, generally comprise a master or central pulse generator, which through the medium of various frequency dividing circuits, counters, and the like, generates a plurality of synchronizing signals which are supplied throughout the data processor to synchronize the operation of the various portions of the processor.

(2) Description of the Prior Art

There are numerous items of prior art relating to pulse checking circuitry for checking the sequence and duration of pulse trains, but none which specifically provide a pulse distribution system of the type herein disclosed, nor a pulse width arrival and checking system as also disclosed in the present application.

SUMMARY OF THE INVENTION

The present invention provides an arrangement for distributing clock pulses and associated gate pulses within a data processor system, which insures that under normal operating conditions the clock pulses and clock gates will be provided to the associated subsystems at the proper time. Included in the arrangement is circuitry for checking that the pulses do bear the proper relation to each other.

A central clock signal generator generates a plurality of odd and even clock pulses which are distributed to a plurality of logic and circuit modules by clock signal lines of equal length. The central signal generator also generates a plurality of gate pulses which are supplied to the modules on signal lines which can be different in length from one to another. The gate pulses are wide enough to coincide with the clock pulses with appropriate allowance for skew between the pulses. For each pair of pulses engaged delivered to a module a detection circuit is provided which detects if the gate pulse and the clock pulse begin and end in the proper sequence. If an improper sequence occurs, the information is stored in a scannable latch and a machine stop control is generated. The exact failing module can be traced readily from the information supplied in this manner.

Accordingly, a principal object of this invention is to provide an improved clocking pulse generating and distribution system for use in data processing equipment.

Another object of the invention is to provide an improved clock pulse generating and distribution system with provision of improved means for checking the sequence and width of clock pulses delivered by the system.

Still another object of the invention is to provide an improved circuit for detecting the reception of clock pulses with respect to accompanying clock gates.

Other objects of the invention and features of novelty thereof will be apparent from the following description taken in connection with the accompanying drawings.

DESCRIPTION OF THE DRAWINGS

Similar reference characters refer to similar parts in each of the several views.

DESCRIPTION OF THE PREFERRED EMBODIMENT

Figure 1:
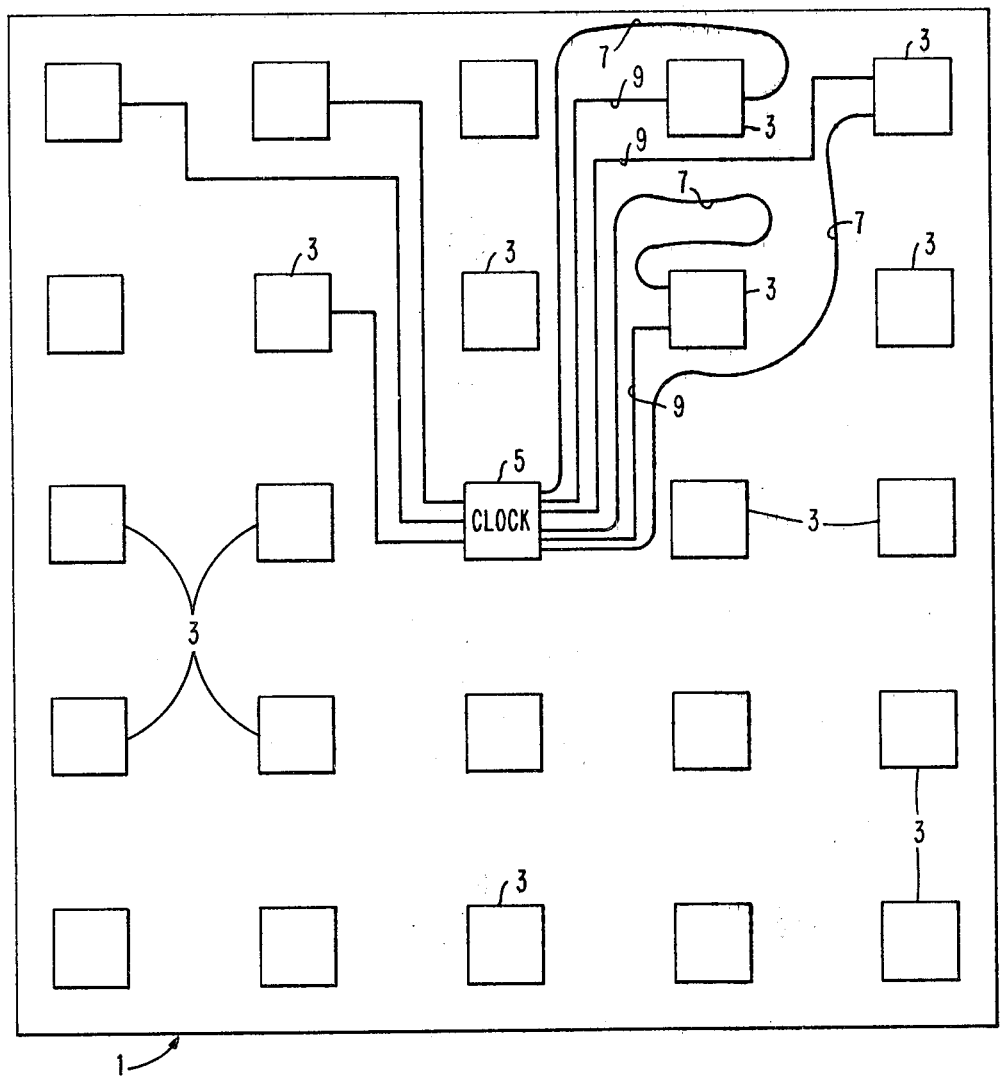
FIG. 1 is a schematic illustration of a circuit board or carrier showing the arrangement of modules thereon with respect to a central clock generator.

Referring to FIG. 1 of the drawings, there is shown a circuit board 1, on which are mounted a plurality of modules 3, which may be arranged in a rectangular array on the board 1 as shown. Each of these modules may contain one or more so-called circuit chips, on which a plurality of interconnected logic and/or memory circuits may be provided. The modules are interconnected with each other and with terminals external to board 1 by discrete wires or by wiring of the printed circuit type. These details are not shown since they are not germane to the present invention.

To provide appropriate synchronizing signals for the operation of the circuitry, a common clock or signal generator 5 is provided and is preferably located at the geographic center of the board 1.

A variety of timing signals is generated by the clock circuitry, and these signals are distributed from the clock module 5 to each of the modules 3 on board 1. Although the connections shown in FIG. 1 are indicated by a single line, it is to be understood that in actuality a plurality of lines or pairs of lines may be provided from the clock module to each of the modules 3.

The timing signal lines extending from clock 5 to the various modules 3 comprise two distinct types. First, there are a plurality of clock signal lines which are divided into even clock and odd clock lines which carry even and odd clock pulses that are interspersed with each other.

The lines bearing the even and odd clock pulses are all of equal length as measured from the clock module 5. As shown in FIG. 1, the clock pulse lines such as lines 7 would all be of equal length and would be arranged in a serpentine fashion to reach the associated module 3.

Also, from the clock module 5 lines bearing even and odd gate signals are supplied to each of the circuit modules 3 on board 1. These lines, such as, for example, the lines 9, are run in a more or less direct fashion to the associated module 3, and accordingly are of varying lengths.

The odd and even timing gates are generated by multiple ring circuits in the clock module 5 and propagation time is, of course, dependent on the distance from the clock module 5 to the particular circuit module 3. The odd and even gates are developed by the odd and even clock pulses and are therefore skewed by the accumulation of circuit and propagation delay from the odd and even clock timings.

Each of the circuit modules 3 will develop specific timings required for its own operations by ANDing the odd time clock pulses with the specific odd gates and even time clock pulses with specific even gates. The specific timings required in a particular module are developed by circuitry contained on a single multiple usage chip provided in each of the multiple chip modules and hereafter referred to as the clock distribution chip.

Figure 2:
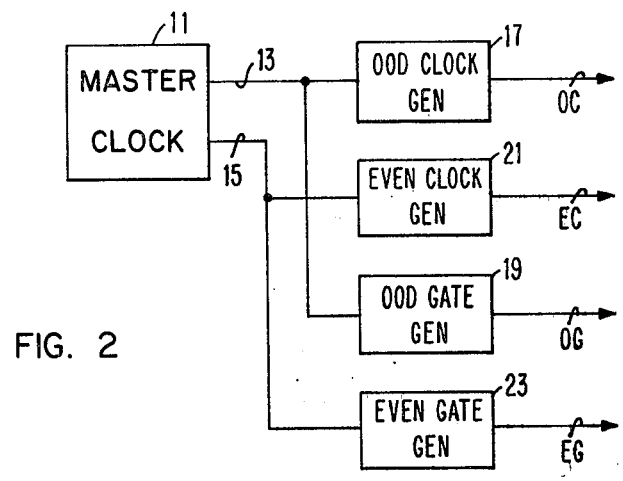
FIG. 2 is a schematic diagram showing the manner in which the odd and even clock pulses and odd and even gates are generated from a master clock source.

FIG. 2 of the drawings shows a schematic diagram of a portion of the circuitry employed in the clock module 5. As illustrated, there is provided a master clock 11 which generates a series of pulses on two output lines, one designated as odd output or line 13 and the other line 15 being designated as even output. Signals on these lines are at the same frequency and interleaved and comprise square wave pulses. The pulses on line 13 are supplied as inputs to an odd clock generator 17 and an odd gate generator 19, the outputs of which are designated by the references characters OC and OG respectively.

The signals on line 15 shown on FIG. 2 are supplied to the inputs of an even clock generator 21 and an even gate generator 23, the outputs of which are designated as EC and EG respectively.

It should be noted that more than one set of odd and even clock pulses and odd and even gates may be generated in the master clock module 5. For example, in one proposed arrangement there will be five sets of odd and even clock and gate pairs.

The invention provides a verification of the reception of the gate signals and appropriate length thereof to assure proper generation of clocking signals internal to the receiving module 3. The arrangement will verify that all of the clock gates destined to the particular module are received and that they are not skewed to such an extreme where the clock time that is generated is chopped or generated as two short clocks instead of a single clock. It will also detect an open or shorted condition on a gate input. This will verify the integrity of the clock at each receiving module, assuring that all modules 3 are synchronized in time relative to each other.

Each of the clock distribution chips provided in each one of the modules 3 includes checking circuitry, one for each of the pairs of clock pulse and clock gates provided to the chip.

Figure 3:
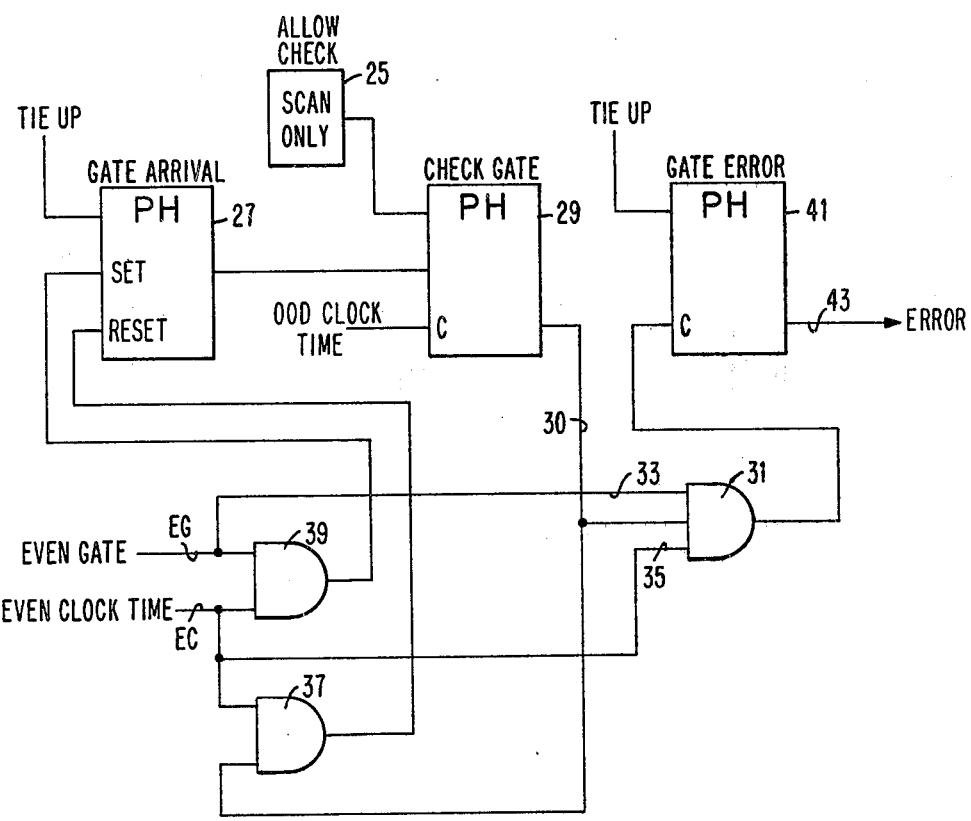
FIG. 3 is a schematic logic diagram showing the arrangement used for checking the proper occurrence and sequence of the even clock time pulse and its associated even gate.

The gate checking circuitry, for each gate, consists of three polarity-hold latches and associated gate circuits. One such circuit is shown in FIG. 3 of the drawings.

A scan-only latch 25 provides the ability to degate the checking arrangement. The primary function of this latch is to provide degate capability for unused gates which is required because with multiple usage of the clock distribution chip, in many cases all of the available gates are not used. The secondary usage is to allow for maintaining the set condition of the gate arrival latch 27.

The gate arrival latch 27 provides the ability to assure that the gate was present during a clock cycle. This function can be used as an initial test to assure that all gates expected are received. In normal operation it will be turned on at the active gate time and turned off after the data is transferred to the check gate latch. The check gate latch 29 opens a window or time period in which it is verified that the respective gate is not present at the next clock time. The clock gate must be present as an envelope only over the clock period following the clock time associated with the specific gate. As can be seen from the drawing, the output of the gate arrival latch 27 is supplied to the input of check gate latch 29. The output of latch 29 is supplied as one input to an AND gate 31, the other inputs of which are the lines 33 and 35, carrying the even gate and even clock time signals from the lines EG and EC respectively. The output of check gate 29 is also supplied on its output line 30 to one input of an AND gate 37, the other input of which is connected to the even clock line EC. The output of AND gate 37 is supplied to the reset terminal of gate arrival latch 27. The set input of latch 27 is connected to the output of another AND circuit 39, the inputs of which are connected to the lines EG and EC as shown.

The output of AND gate 31 is supplied to the gate error latch 41, which when in its "on" state provides an output signal on line 43 indicating an error in the timing and presence of the pulse and gate signals. The gate error latch will be turned on if, during the period of the check gate signal, the gate and its respective clock time are present. This is at set only latch and once set will indicate the machine error on line 43, and it will be maintained in this condition until reset by machine check interrogation controls, not shown.

For verification of the reception of the clock gate, all of the allow check scan-only latches will be turned off by suitable controls, again not shown. The master clock 5 will then be run for one maximum length cycle, such for example as eight clock periods and thereafter the gate arrival latches 27 will be read to verify that all destined gates arrived at their destination.

Checking for excessive skew of the clock and the gate pulses is done during normal processor operation. After verifying if all the destined gates arrived at their destination, the allow check latches 25 associated with active destined gates will be turned on. The machine will then be set to its run mode and normal processing is begun. In the event that a gate line has excessive skew, it will be detected and a machine check or alarm will occur. When the latches are read out in the usual manner of scanning they will point to the particular gate that has excessive skew.

Figure 4:
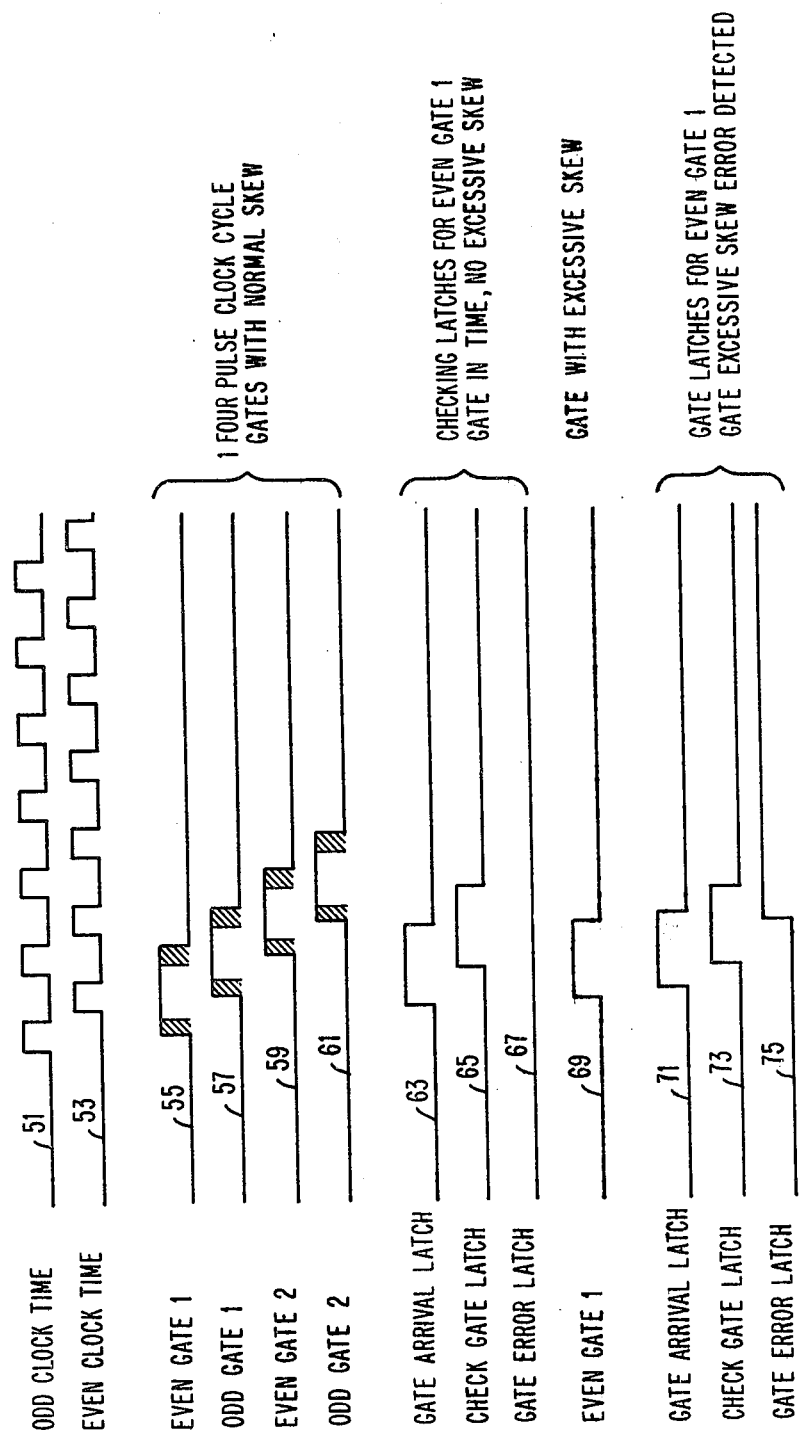
FIG. 4 is a timing diagram showing the relationship of the pulses occurring at different times in different portions of the system.

FIG. 4 of the drawings illustrates the wave forms which are present at various locations in the circuitry shown in FIG. 3, and at different times and conditions of the system.

Wave forms 51 and 53, show the sequence of pulses and their interleaved relation for the odd and even clock times. The wave forms 55, 57, 59 and 61 are for even and odd gates 1, and even and odd gates 2 as designated in the drawing. This is representative of a single four-pulse clock cycle in which the gates have a normal skew as shown by the hatched portion.

With the gate pulses with normal skew, as indicated in the drawing by wave forms 55 through 61, the outputs from the gate arrival latch, the check gate latch and the gate error latch are as shown in wave form 63, 65 and 67. It will be noted that with this combination of the wave forms the gate error latch 67 remains off. The next wave form, 69, indicates an even gate 1 signal with an excessive skew. Under these circumstances the gate arrival latch, the check gate latch and the gate error latch behave as indicated in wave form 71, 73 and 75. It will be noted that this combination of inputs will set gate error latch on and an output therefore will be provided on the line 43 of the circuitry shown on FIG. 3 to indicate that an excessive skew error has been detected.

It will be apparent from the foregoing that the present invention provides an improved arrangement for distribution of timing signals to a plurality of circuit modules contained within a digital system employing a centralized source or clock of synchronizing signals. The arrangement includes means for checking the proper sequence and timing of the arrival of the signals at the circuit modules where they are to be used.

While the invention has been particularly shown and described with reference to a preferred embodiment thereof, it will be understood by those skilled in the art that various changes in form and details may be made therein without departing from the spirit and scope of the invention.

We claim:

1. In a timing pulse distribution system in which first and second pairs of timing pulse signals and gate signals are supplied recurrently to inputs of timing pulse receiving elements, said gate pulses occurring in synchronism with said timing pulses and having a width greater than said timing pulses and centered on associated timing pulses, checking means connected to the inputs of said timing pulse receiving elements for checking the sequence and duration of said gate pulses with respect to said timing pulses, said checking means comprising, in combination:

a first and a second bistable storage element;

first circuit means connecte between said inputs and said first bistable element for setting said first bistable element in a first state during the coincidence of a timing pulse signal and a gate signal from the first of said pairs of timing pulse signals and gate signals at said inputs;

second circuit means connected between said first and said second bistable storage element for setting said second bistable element in a first state when, and only when, said first bistable element is in its first state and a timing pulse of the second of said pairs of timing pulse signals and gate signals is received in said second bistable element; and third circuit means operatively coupled to said second bistable storage element for providing an indication of the state of said second bistable storage element during the occurrence of a first pair of said timing pulse signals and gate signals at said inputs.

2. The combination as claimed in claim 1 further characterized by said first and second bistable elements comprising first and second electronic latches.

3. The combination as claimed in claim 2, further characterized by said third circuit means comprising a third electronic latch.

4. The combination as claimed in claim 2, further characterized by reset circuit means connected between the output of said second latch and the input of said first latch for setting said first latch to a second state, in response to an output signal from said second latch and the timing pulse signal of said first pair of signals.

5. The combination as claimed in claim 1 in which said first circuit means includes an AND gate having the first pair of said pair of signals as gate inputs and having a gate output connected to said first bistable element and effective when energized to set said first bistable element to its first state.

* * * * *

UNITED STATES PATENT AND TRADEMARK OFFICE
CERTIFICATE OF CORRECTION

PATENT NO. : 4,482,819

DATED : November 13, 1984

INVENTOR(S) : Bharat J. Oza et al

It is certified that error appears in the above-identified patent and that said Letters Patent is hereby corrected as shown below:

Column 5, line 30    Delete "connecte" and substitute therefor --connected--

Signed and Sealed this

Thirtieth Day of April 1985

[SEAL]

Attest:

DONALD J. QUIGG

Attesting Officer    Acting Commissioner of Patents and Trademarks